(No Model.)
W. BUCKLEY.
METALLIC SPRING
No. 345,767. Patented July 20, 1886.
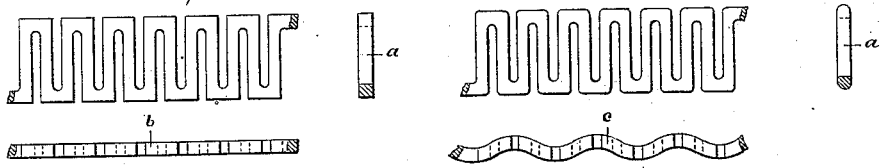
FIG. 1.
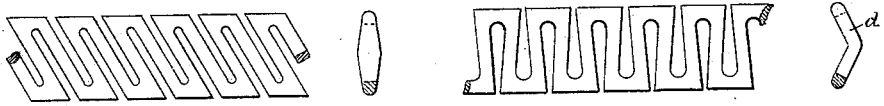
FIG. 2. FIG. 3.
FIG. 4. FIG. 5.
FIG. 6. FIG. 7.
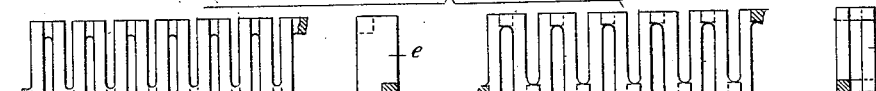
FIG. 8.
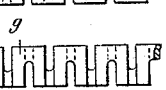
FIG. 9. FIG. 10. FIG. 11. FIG. 12. FIG. 13. FIG. 14. FIG. 15. FIG. 16. FIG. 17. FIG. 18.
FIG. 19. FIG. 20.
Witnesses
Bristow Hunt
John Thos. Pagan
Inventor:
Wm Buckley
by his attorneys
Briesen & Steele
N. PETERS, Photo-Lithographer, Washington, D. C.

UNITED STATES PATENT OFFICE.

WILLIAM BUCKLEY, OF SHEFFIELD, COUNTY OF YORK, ENGLAND.

METALLIC SPRING.

SPECIFICATION forming part of Letters Patent No. 345,767, dated July 20, 1886.

Application filed November 21, 1885. Serial No. 183,583. (No model.) Patented in England November 14, 1884, No. 15,021.

*To all whom it may concern:*

Be it known that I, WILLIAM BUCKLEY, a subject of the Queen of Great Britain, residing at Sheffield, in the county of York, in England, engineer, have invented certain new and useful Improvements in Metallic Springs, (for which I applied for Letters Patent in Great Britain on the 14th day of November, 1884, No. 15,021,) of which the following is a specification.

My invention relates to a new construction or manufacture of metallic springs applicable for all purposes wherein durable elastic metallic springs are required or used, the special object of my invention being the production of a spring or springs that will expand, contract, or compress, and at the same time will be very durable and elastic.

My improved spring is made of steel, phosphor-bronze, brass, or of other suitable metallic material or compound, and of a flat, square, round, oval, or of any desired form or section.

According to one method of practically carrying out my invention, I take a rod, bar, or plate of the desired metallic material and section, and this rod, bar, or plate I cut or slit transversely or crosswise from one edge or side and as near to the other edge or side as necessary or desirable. The cuts or slits are made from both edges or sides of the rod, bar, or plate. Every alternate cut or slit can be made from the same edge or side, or two or more consecutive cuts or slits may be made from the same edge or side. The cuts or slits can be made straight across the rod, bar, or plate, at right angles to its edge or side, or in a slanting, angular, or other convenient direction. They may be parallel or all of one width, or narrower at the top and wider at the bottom, or vice versa. The corners of the cuts or slits are made either angular, circular, or of other suitable shapes, and the cuts or slits may be made at regular or certain or at varied or irregular distances from each other, and they may also be of various widths and shapes. The rod, bar, or plate being cut or slit, as described, to any required length or lengths, forms a spring of a strong, elastic, and efficient character, and this, too, whether the spring or springs be bent in a circular form, as an elastic support for loads placed upon them, or be required to be used in a straight form for resisting horizontal strain, or otherwise.

According to another method of carrying out my invention in practice the spring can be cast with the cuts or slits in it. The operation of cutting or forming the cuts or slits is then unnecessary. The spring by this method of manufacture may be cast in a circular or semicircular form, or in a length or lengths, or in segments, and afterward be bent or arranged into a circle or other desired form.

The springs made according to this invention may be bent or dished lengthwise in such a manner that the section thereof will show a curved or angular form, and they may also be transversely dished at regular or irregular distances. The edges thereof may be made even or parallel, or may be so made as to form an uneven or undulating line, or portions of the edges may be cut away, so that some parts of the spring will stand or be higher than the rest or other parts.

These springs can be made either in one entire length or circle, or they may be made in in any suitable number of lengths, segments, or parts, and either straight, parallel, curved, or otherwise, and, if necessary, any suitable number and sizes of springs may be arranged to be used together, instead of one.

Springs made as hereinbefore described will be found very suitable for expanding, contracting, or compressing in a circular or other form, and may be used for all purposes where metallic springs are required.

In order that the practical carrying out of my invention may be fully understood, I have illustrated it on the accompanying sheet of drawings.

Figure 1 represents and comprises elevations of a portion of a spring cut or slit straight across at right angles to its sides or edges. *a a* are sections of the spring. *b* is an edge view of the spring on a straight line. *c* is an edge view of the spring dished transversely.

Fig. 2 is an elevation of a portion of a spring cut or slit in an angular or slanting direction.

Figs. 3 and 4 are elevations of portions of springs in which the cuts or slits are wider at the bottom than at the top. *d* is an end view of the spring dished lengthwise.

Fig. 5 is an elevation of a portion of a spring with the cuts or slits made circular at the bottom or end. Fig. 6 is an elevation of a portion of a spring with parts of the edges cut away, showing some parts of the spring standing higher than the rest. These springs are elastic in a direction at right angles to their slits or incisions. Fig. 7 is an elevation of a portion of a spring with the edges forming an uneven or a curved or an undulating line.

Fig. 8 represents elevations of portions of springs cut or slit on both edges and sides. *e* and *f* are sections of the same.

Figs. 9 to 18 are some examples of sections or end views of cut springs. Fig. 19 shows an elevation and a plan of a spring in a circular form. Fig. 20 shows an elevation and plan of a spring, also in a circular form, but dished transversely.

Having described the nature of my invention and the manner of performing the same, I wish it to be understood that I do not limit myself to the precise details of my improvements in metallic springs as hereinbefore described, and as illustrated in the accompanying sheet of drawings, because numerous modifications or variations can be made therein without departing from the principles or main features of my invention; and I also wish it to be understood that the precise forms or shapes of the springs, the section of the same, or the material from which they are made, are not material to this invention; and, in conclusion, I declare that what I claim as my invention, and desire to secure by Letters Patent, is—

A metallic spring constructed with alternating slits or incisions in its two opposite edges, substantially as herein shown and described.

In testimony whereof I have signed my name to this specification in the presence of two subscribing witnesses.

WM. BUCKLEY.

Witnesses:
BRISTOW HUNT,
JNO. THOS. PAJAN.